United States Patent
Garrity et al.

(10) Patent No.: US 9,088,216 B2
(45) Date of Patent: *Jul. 21, 2015

(54) CONTROLLER FOR A SYNCHRONOUS RECTIFIER SWITCH

(75) Inventors: Paul Garrity, Rockwall, TX (US); Zaohong Yang, Richardson, TX (US)

(73) Assignee: Power Systems Technologies, Ltd., Ebene (MU)

( * ) Notice: Subject to any disclaimer, the term of this patent is extended or adjusted under 35 U.S.C. 154(b) by 694 days.

This patent is subject to a terminal disclaimer.

(21) Appl. No.: 12/689,881

(22) Filed: Jan. 19, 2010

(65) Prior Publication Data

US 2010/0188876 A1  Jul. 29, 2010

Related U.S. Application Data

(60) Provisional application No. 61/145,657, filed on Jan. 19, 2009.

(51) Int. Cl.
- *H02M 7/217* (2006.01)
- *H02M 7/219* (2006.01)
- *H02M 1/42* (2007.01)
- *H02M 7/00* (2006.01)

(52) U.S. Cl.
CPC ............ *H02M 7/219* (2013.01); *H02M 1/4225* (2013.01); *Y02B 70/126* (2013.01); *Y02B 70/1408* (2013.01)
USPC .......................................... 363/127; 363/125

(58) Field of Classification Search
USPC ........... 363/34, 37, 48, 53, 84, 106, 108, 125, 363/127
See application file for complete search history.

(56) References Cited

U.S. PATENT DOCUMENTS

| | | | |
|---|---|---|---|
| 1,376,978 A | 5/1921 | Stoekle |
| 2,387,943 A | 10/1945 | Putman |
| 2,473,662 A | 6/1949 | Pohm |
| 3,007,060 A | 10/1961 | Guenther |

(Continued)

FOREIGN PATENT DOCUMENTS

| CM | 101141099 | 3/2008 |
|---|---|---|
| CN | 2904469 Y | 5/2007 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Adolf Berhane
*Assistant Examiner* — Henry Lee, III
(74) *Attorney, Agent, or Firm* — Boisbrun Hofman, PLLC (57) ABSTRACT

A controller for a power converter and method of operating the same employable with a bridge rectifier having first and second synchronous rectifier switches. In one embodiment, the controller includes an amplifier configured to enable a turn-on delay for the first synchronous rectifier switch. The controller also includes a discharge switch having first and second switched terminals coupled to gate and source terminals, respectively, of the first synchronous rectifier switch and configured to discharge a gate-to-source capacitance of the first synchronous rectifier switch to enable a turn off thereof.

20 Claims, 8 Drawing Sheets

(56) References Cited

U.S. PATENT DOCUMENTS

| | | | |
|---|---|---|---|
| 3,346,798 | A | 10/1967 | Dinger |
| 3,358,210 | A | 12/1967 | Grossoehme |
| 3,433,998 | A | 3/1969 | Woelber |
| 3,484,562 | A | 12/1969 | Kronfeld |
| 3,553,620 | A | 1/1971 | Cielo et al. |
| 3,622,868 | A | 11/1971 | Todt |
| 3,681,679 | A | 8/1972 | Chung |
| 3,708,742 | A | 1/1973 | Gunn |
| 3,708,744 | A | 1/1973 | Stephens et al. |
| 4,011,498 | A | 3/1977 | Hamsra |
| 4,019,122 | A | 4/1977 | Ryan |
| 4,075,547 | A | 2/1978 | Wroblewski |
| 4,202,031 | A | 5/1980 | Hesler et al. |
| 4,257,087 | A | 3/1981 | Cuk |
| 4,274,071 | A | 6/1981 | Pfarre |
| 4,327,348 | A | 4/1982 | Hirayama |
| 4,471,423 | A | 9/1984 | Hase |
| 4,499,481 | A | 2/1985 | Greene |
| 4,570,174 | A | 2/1986 | Huang et al. |
| 4,577,268 | A | 3/1986 | Easter et al. |
| 4,581,691 | A | 4/1986 | Hock |
| 4,613,841 | A | 9/1986 | Roberts |
| 4,636,823 | A | 1/1987 | Margalit et al. |
| 4,660,136 | A | 4/1987 | Montorefano |
| 4,672,245 | A | 6/1987 | Majumdar et al. |
| 4,770,667 | A | 9/1988 | Evans et al. |
| 4,770,668 | A | 9/1988 | Skoultchi et al. |
| 4,780,653 | A | 10/1988 | Bezos et al. |
| 4,785,387 | A | 11/1988 | Lee et al. |
| 4,799,138 | A | 1/1989 | Chahabadi et al. |
| 4,803,609 | A | 2/1989 | Gillett et al. |
| 4,823,249 | A | 4/1989 | Garcia, II |
| 4,837,496 | A | 6/1989 | Erdi |
| 4,866,367 | A | 9/1989 | Ridley et al. |
| 4,887,061 | A | 12/1989 | Matsumura |
| 4,899,271 | A | 2/1990 | Seiersen |
| 4,903,089 | A | 2/1990 | Hollis et al. |
| 4,922,400 | A | 5/1990 | Cook |
| 4,962,354 | A | 10/1990 | Visser et al. |
| 4,964,028 | A | 10/1990 | Spataro |
| 4,999,759 | A | 3/1991 | Cavagnolo et al. |
| 5,003,277 | A | 3/1991 | Sokai et al. |
| 5,014,178 | A | 5/1991 | Balakrishnan |
| 5,027,264 | A | 6/1991 | DeDoncker et al. |
| 5,055,991 | A | 10/1991 | Carroll et al. |
| 5,068,756 | A | 11/1991 | Morris et al. |
| 5,106,778 | A | 4/1992 | Hollis et al. |
| 5,126,714 | A | 6/1992 | Johnson |
| 5,132,888 | A | 7/1992 | Lo et al. |
| 5,134,771 | A | 8/1992 | Lee et al. |
| 5,172,309 | A | 12/1992 | DeDoncker et al. |
| 5,177,460 | A | 1/1993 | Dhyanchand et al. |
| 5,182,535 | A | 1/1993 | Dhyanchand |
| 5,204,809 | A | 4/1993 | Andresen |
| 5,206,621 | A | 4/1993 | Yerman |
| 5,208,739 | A | 5/1993 | Sturgeon |
| 5,223,449 | A | 6/1993 | Morris et al. |
| 5,225,971 | A | 7/1993 | Spreen |
| 5,231,037 | A | 7/1993 | Yuan et al. |
| 5,244,829 | A | 9/1993 | Kim |
| 5,262,930 | A | 11/1993 | Hua et al. |
| 5,282,126 | A | 1/1994 | Husgen |
| 5,291,382 | A | 3/1994 | Cohen |
| 5,303,138 | A | 4/1994 | Rozman |
| 5,305,191 | A | 4/1994 | Loftus, Jr. |
| 5,335,163 | A | 8/1994 | Seiersen |
| 5,336,985 | A | 8/1994 | McKenzie |
| 5,342,795 | A | 8/1994 | Yuan et al. |
| 5,343,140 | A | 8/1994 | Gegner |
| 5,353,001 | A | 10/1994 | Meinel et al. |
| 5,369,042 | A | 11/1994 | Morris et al. |
| 5,374,887 | A | 12/1994 | Drobnik |
| 5,399,968 | A | 3/1995 | Sheppard et al. |
| 5,407,842 | A | 4/1995 | Morris et al. |
| 5,453,923 | A | 9/1995 | Scalais et al. |
| 5,459,652 | A | 10/1995 | Faulk |
| 5,468,661 | A | 11/1995 | Yuan et al. |
| 5,477,175 | A | 12/1995 | Tisinger et al. |
| 5,508,903 | A | 4/1996 | Alexndrov |
| 5,523,673 | A | 6/1996 | Ratliff et al. |
| 5,539,630 | A | 7/1996 | Pietkiewicz et al. |
| 5,554,561 | A | 9/1996 | Plumton |
| 5,555,494 | A | 9/1996 | Morris |
| 5,581,224 | A | 12/1996 | Yamaguchi |
| 5,610,085 | A | 3/1997 | Yuan et al. |
| 5,624,860 | A | 4/1997 | Plumton et al. |
| 5,636,116 | A * | 6/1997 | Milavec et al. ................. 363/89 |
| 5,661,642 | A | 8/1997 | Shimashita |
| 5,663,876 | A | 9/1997 | Newton et al. |
| 5,671,131 | A | 9/1997 | Brown |
| 5,700,703 | A | 12/1997 | Huang et al. |
| 5,712,189 | A | 1/1998 | Plumton et al. |
| 5,719,544 | A | 2/1998 | Vinciarelli et al. |
| 5,734,564 | A | 3/1998 | Brkovic |
| 5,736,842 | A | 4/1998 | Jovanovic |
| 5,742,491 | A | 4/1998 | Bowman et al. |
| 5,747,842 | A | 5/1998 | Plumton |
| 5,756,375 | A | 5/1998 | Celii et al. |
| 5,760,671 | A | 6/1998 | Lahr et al. |
| 5,783,984 | A | 7/1998 | Keuneke |
| 5,784,266 | A | 7/1998 | Chen |
| 5,804,943 | A | 9/1998 | Kollman et al. |
| 5,815,383 | A | 9/1998 | Lei |
| 5,815,386 | A | 9/1998 | Gordon |
| 5,864,110 | A | 1/1999 | Moriguchi et al. |
| 5,870,296 | A | 2/1999 | Schaffer |
| 5,870,299 | A | 2/1999 | Rozman |
| 5,880,942 | A | 3/1999 | Leu |
| 5,886,508 | A | 3/1999 | Jutras |
| 5,889,298 | A | 3/1999 | Plumton et al. |
| 5,889,660 | A | 3/1999 | Taranowski et al. |
| 5,900,822 | A | 5/1999 | Sand et al. |
| 5,907,481 | A | 5/1999 | Svardsjo |
| 5,909,110 | A | 6/1999 | Yuan et al. |
| 5,910,665 | A | 6/1999 | Plumton et al. |
| 5,920,475 | A | 7/1999 | Boylan et al. |
| 5,925,088 | A | 7/1999 | Nasu |
| 5,929,665 | A | 7/1999 | Ichikawa et al. |
| 5,933,338 | A | 8/1999 | Wallace |
| 5,940,287 | A | 8/1999 | Brkovic |
| 5,946,207 | A | 8/1999 | Schoofs |
| 5,956,245 | A * | 9/1999 | Rozman ........................ 363/89 |
| 5,956,578 | A | 9/1999 | Weitzel et al. |
| 5,959,850 | A | 9/1999 | Lim |
| 5,977,853 | A | 11/1999 | Ooi et al. |
| 5,982,640 | A | 11/1999 | Naveed et al. |
| 5,999,066 | A | 12/1999 | Saito et al. |
| 5,999,429 | A | 12/1999 | Brown |
| 6,003,139 | A | 12/1999 | McKenzie |
| 6,008,519 | A | 12/1999 | Yuan et al. |
| 6,011,703 | A | 1/2000 | Boylan et al. |
| 6,038,154 | A | 3/2000 | Boylan et al. |
| 6,046,664 | A | 4/2000 | Weller et al. |
| 6,055,166 | A | 4/2000 | Jacobs |
| 6,060,943 | A | 5/2000 | Jansen |
| 6,067,237 | A | 5/2000 | Nguyen |
| 6,069,798 | A | 5/2000 | Liu |
| 6,069,799 | A | 5/2000 | Bowman et al. |
| 6,078,510 | A | 6/2000 | Spampinato et al. |
| 6,084,792 | A | 7/2000 | Chen et al. |
| 6,094,038 | A | 7/2000 | Lethellier |
| 6,097,046 | A | 8/2000 | Plumton |
| 6,125,046 | A | 9/2000 | Jang et al. |
| 6,144,187 | A | 11/2000 | Bryson |
| 6,147,886 | A | 11/2000 | Wittenbreder |
| 6,156,611 | A | 12/2000 | Lan et al. |
| 6,160,374 | A | 12/2000 | Hayes et al. |
| 6,160,721 | A | 12/2000 | Kossives et al. |
| 6,163,466 | A | 12/2000 | Davila, Jr. et al. |
| 6,181,231 | B1 | 1/2001 | Bartilson |
| 6,188,586 | B1 | 2/2001 | Farrington et al. |
| 6,191,964 | B1 | 2/2001 | Boylan et al. |
| 6,208,535 | B1 | 3/2001 | Parks |
| 6,212,084 | B1 * | 4/2001 | Turner ........................ 363/127 |

(56) References Cited

U.S. PATENT DOCUMENTS

| | | |
|---|---|---|
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 * | 10/2002 | Jansen ............... 327/365 |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshio |
| 6,597,588 B2 | 7/2003 | Matsumoto |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,636,025 B1 | 10/2003 | Irissou |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimermann et al. |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,375,994 B2 | 5/2008 | Andreycak |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,471,527 B2 | 12/2008 | Chen |
| 7,489,225 B2 | 2/2009 | Dadafshar |
| 7,499,295 B2 | 3/2009 | de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,583,555 B2 | 9/2009 | Kang |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |

(56) References Cited

U.S. PATENT DOCUMENTS

| | | |
|---|---|---|
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 8,184,456 B1 | 5/2012 | Jain et al. |
| 8,278,889 B2 | 10/2012 | Tataeishi |
| 8,467,199 B2 | 6/2013 | Lee et al. |
| 8,488,355 B2 | 7/2013 | Berghegger |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,767,418 B2 | 7/2014 | Jungreis et al. |
| 8,787,043 B2 | 7/2014 | Berghegger |
| 8,792,256 B2 | 7/2014 | Berghegger |
| 8,792,257 B2 | 7/2014 | Berghegger |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0121647 A1 | 9/2002 | Taylor |
| 2002/0126512 A1 | 9/2002 | Nakagawa et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 | 9/2004 | Vinciarelli |
| 2004/0196672 A1 | 10/2004 | Amei |
| 2004/0200631 A1 | 10/2004 | Chen |
| 2004/0201380 A1 | 10/2004 | Zimmermann et al. |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumuar |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2006/0286865 A1 | 12/2006 | Chou et al. |
| 2007/0007945 A1 | 1/2007 | King et al. |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1* | 3/2007 | Shekhawat et al. ............ 363/89 |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 | 6/2007 | Lo |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0030178 A1 | 2/2008 | Leonard et al. |
| 2008/0031021 A1 | 2/2008 | Ros et al. |
| 2008/0037294 A1 | 2/2008 | de Silva et al. |
| 2008/0043503 A1 | 2/2008 | Yang |
| 2008/0054874 A1 | 3/2008 | Chandrasekaran et al. |
| 2008/0061746 A1 | 3/2008 | Kobayashi et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0198638 A1 | 8/2008 | Reinberger et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tataeishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0027926 A1 | 1/2009 | Yang et al. |
| 2009/0037768 A1 | 2/2009 | Adams |
| 2009/0046486 A1 | 2/2009 | Lu et al. |
| 2009/0072626 A1 | 3/2009 | Watanabe et al. |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0302986 A1 | 12/2009 | Bedea |
| 2009/0310388 A1 | 12/2009 | Yang |
| 2009/0315530 A1 | 12/2009 | Baranwal |
| 2010/0020578 A1 | 1/2010 | Ryu et al. |
| 2010/0054000 A1 | 3/2010 | Huynh |
| 2010/0066336 A1 | 3/2010 | Araki et al. |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |

(56) References Cited

U.S. PATENT DOCUMENTS

| | | |
|---|---|---|
| 2010/0164400 A1 | 7/2010 | Adragna |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0202165 A1 | 8/2010 | Zheng et al. |
| 2010/0213989 A1 | 8/2010 | Nakatake |
| 2010/0219802 A1 | 9/2010 | Lin et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0025289 A1 | 2/2011 | Wang et al. |
| 2011/0038179 A1 | 2/2011 | Zhang |
| 2011/0062926 A1 | 3/2011 | Qiu et al. |
| 2011/0080102 A1 | 4/2011 | Ge et al. |
| 2011/0089917 A1 | 4/2011 | Chen et al. |
| 2011/0095730 A1 | 4/2011 | Strijker et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0020119 A1 | 1/2012 | Tang et al. |
| 2012/0243271 A1 | 9/2012 | Berghegger |
| 2012/0250378 A1 | 10/2012 | Kok et al. |
| 2013/0003430 A1 | 1/2013 | Reddy |
| 2013/0229829 A1 | 9/2013 | Zhang et al. |
| 2013/0250627 A1 | 9/2013 | Herfurth |
| 2014/0091720 A1 | 4/2014 | Brinlee |
| 2014/0254215 A1 | 9/2014 | Brinlee et al. |
| 2014/0301111 A1 | 10/2014 | Jungreis et al. |

FOREIGN PATENT DOCUMENTS

| | | |
|---|---|---|
| CN | 101202509 | 6/2008 |
| CN | 201252294 | 6/2009 |
| DE | 10112820 A1 | 10/2002 |
| DE | 10310361 A1 | 9/2004 |
| DE | 10352509 A1 | 6/2005 |
| DE | 102013104899 A1 | 11/2014 |
| EP | 0665634 | 8/1995 |
| JP | 57097361 | 6/1982 |
| JP | 3-215911 JP | 9/1991 |
| JP | 2000-68132 | 3/2000 |
| JP | 2008283818 A | 11/2008 |
| WO | 8700991 | 2/1987 |
| WO | 03088463 A1 | 10/2003 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode,"IEEE Proceedings of APEC, pp. 168-174, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics,"Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Chhawchharia, P., et al., "On the Reduction of Component Count in Switched Capacitor DC/DC Convertors," Hong Kong Polytechnic University, IEEE, 1997, Hung Horn, Kowloon, Hong King, pp. 1395-1401.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Kuwabara, K., et al., "Switched-Capacitor DC-DC Converters," Fujitsu Limited, IEEE, 1988, Kawasaki, Japan, pp. 213-218.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Maxim, Application Note 725, www.maxim-ic.com/an725, Maxim Integrated Products, Nov. 29, 2001, 8 pages.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Nguyen, L.D., at al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

(56) References Cited

OTHER PUBLICATIONS

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.
Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.
Yan, L., et al., "Integrated Magnetic Wave Converter with Flexible Output Inductor," IEEE Transactions on Power Electronics, Mar. 2003, pp. 670-678, vol. 18, No. 2, IEEE, Los Alamitos, CA.
Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.
Freescale Semiconductor, "56F8323 Evaluation Module User Manual, 56F8300 16-bit Digital Signal Controllers", MC56F8323EVMUM, Rev. 2, Jul. 2005 (72 pages).
Freescale Semiconductor, "56F8323/56F8123 Data Sheet Preliminary Technical Data, 56F8300 16-bit Digital Signal Controllers," MC56F8323 Rev. 17, Apr. 2007 (140 pages).
Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).
Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Bill Andreycak, Active Clamp and Reset Technique Enhances Forward Converter Performance, Oct. 1994, Texas Instruments, 19 pages.
Ridley, R., Designing with the TL431, Switching Power Magazine, Designer Series XV, pp. 1-5, 2005.

* cited by examiner

FIG. 1

Prior Art

CONTROLLER FOR A SYNCHRONOUS RECTIFIER SWITCH

This application claims the benefit of U.S. Provisional Application No. 61/145,657, entitled "Controller for a Synchronous Rectifier Switch and Power Converter Employing the Same," filed on Jan. 19, 2009, which application is incorporated herein by reference.

TECHNICAL FIELD

The present invention is directed, in general, to power electronics and, more specifically, to controller for a power converter and method of operating the same.

BACKGROUND

A switched-mode power converter (also referred to as a "power converter" or "regulator") is a power supply or power processing circuit that converts an input voltage waveform into a specified output voltage waveform. AC-DC power converters convert an alternating current ("ac") input voltage into a direct current ("dc") output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

To produce a dc output voltage, power converters often employ diodes to rectify an ac voltage. The rectifying devices can introduce a power loss component in a power converter due to the forward voltage drop across the diode, particularly in a power converter that produces an output voltage of five volts or less. Schottky diodes, which have a relatively low forward voltage drop, are often employed in low-voltage power converter applications to reduce a diode forward voltage drop. However, passive rectifying devices such as Schottky diodes typically cannot achieve forward voltage drops of less than about 0.35 volts ("V"), and typically cannot sustain a reverse voltage greater than about 60 volts, thereby limiting a conversion efficiency of the power converter.

To achieve an acceptable level of efficiency, power converters often employ rectifying devices that may have forward voltage drops less than about 0.1 volts. To provide such reduction of power loss, an active switch or active semiconductor switch such as a metal-oxide semiconductor field-effect transistor ("MOSFET"), which provides a resistive voltage drop, is often employed to replace a diode. An active semiconductor switch, however, must be periodically driven into conduction and non-conduction modes or states in synchronism with a periodic waveform of an ac voltage (e.g., an ac voltage produced across an input to the power converter). The active semiconductor switches may thereby avoid the higher forward voltage drops inherent in the passive rectifying devices.

A design issue introduced by substituting an active semiconductor switch for a diode is the need to provide a drive signal therefor that is accurately synchronized with the operation of the power converter to control the conduction and non-conduction modes or states of the active semiconductor switches, and that avoids conduction overlap with other semiconductor switches including diodes. An active semiconductor switch substituted for a diode in a power converter is generally referred to as a "synchronous rectifier" or "synchronous rectifier switch."

A conventional ac-to-dc power converter employs a bridge rectifier to transform an ac sinusoidal input voltage waveform, such as an input voltage waveform produced by an ac mains, into a rectified sinusoidal waveform. Following the bridge rectifier, a power factor correction ("PFC") circuit converts the rectified sinusoidal waveform into a dc waveform with a dc voltage level higher than the peak voltage of the sinusoidal input voltage. The bridge rectifier is usually constructed with four diodes. Due to the forward voltage drop of the diodes, significant power losses are produced by the diodes.

A bridgeless boost PFC circuit may be employed to address the power loss problem associated with the forward voltage drop of the diodes. As a result, conduction losses of the diodes are reduced. However, a bridgeless boost PFC circuit has several significant remaining problems that limit its application in low-cost, high-volume circuits. On the ac side of the circuit, a two-inductor structure introduced by the circuit causes the output voltage to float with respect to the input line voltage. As a result, the circuit produces a high level of electromagnetic interference ("EMI") noise. The location of the boost inductor on the ac side makes it difficult to sense the ac line voltage and the inductor current and the control is a more complicated process compared with control schemes used for a simpler boost PFC circuit or boost power converter coupled to a bridge rectifier. As a result, the bridgeless boost PFC circuit has found limited application.

U.S. Pat. No. 6,060,943, entitled "Circuit Simulating a Diode" to Jansen, issued May 9, 2000 and U.S. Pat. No. 6,469,564, entitled "Circuit Simulating a Diode" to Jansen, issued Oct. 22, 2002, which are both incorporated herein by reference, are directed to a circuit that performs the function of a diode to conduct current in one direction with a low forward voltage drop, but block current in the other direction to produce an improved rectification function. When the voltage at a designated anode terminal of the circuit is higher than the voltage at a designated cathode terminal, a forward current flows. When the polarity of the voltage at these designated terminals is reversed, the current is interrupted.

Each of these approaches, however, provides an efficiency and/or a cost limitation that limits or otherwise penalizes the use of a synchronous rectifier in many applications. Accordingly, what is needed in the art is a controller employable with a synchronous rectifier in a power converter and related method that avoid the deficiencies in the prior art.

SUMMARY OF THE INVENTION

These and other problems are generally solved or circumvented, and technical advantages are generally achieved, by advantageous embodiments of the present invention, including a controller for a power converter and method of operating the same employable with a bridge rectifier having first and second synchronous rectifier switches. In one embodiment, the controller includes an amplifier configured to enable a turn-on delay for the first synchronous rectifier switch. The controller also includes a discharge switch having first and second switched terminals coupled to gate and source terminals, respectively, of the first synchronous rectifier switch and configured to discharge a gate-to-source capacitance of the first synchronous rectifier switch to enable a turn off thereof.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a controller for a switch such as a synchronous rectifier switch with a delay turn on thereof, and a method of operating the same. While the principles of the present invention will be described in the environment of a power converter, any application that may benefit from a controller such as a power amplifier or a motor controller is well within the broad scope of the present invention. Additionally, while the principles of the present invention will be described with respect to field-effect transistors including gate, source and drain terminals, the principles are equally applicable to any types of switches having control and switched terminals.

Figure 1:
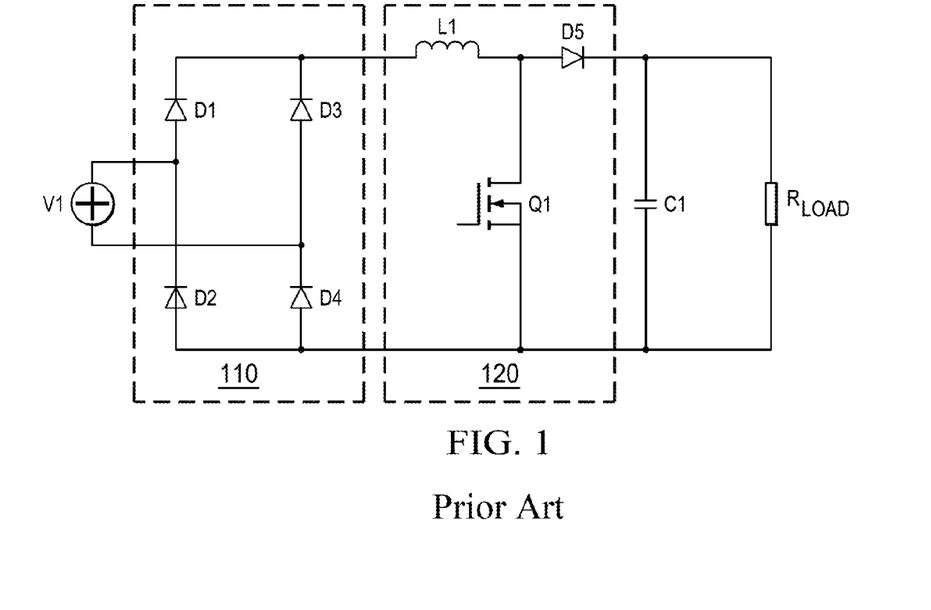
FIG. 1 illustrates a schematic diagram of an embodiment of a power converter including a bridge rectifier coupled to a boost power converter that provides an environment for application of the principles of the present invention.

Turning now to FIG. 1, illustrated is a schematic diagram of an embodiment of a power converter (e.g., an ac-to-dc power converter) including a bridge rectifier 110 coupled to a boost power converter 120 (also referred to as a "boost power train") that provides an environment for application of the principles of the present invention. The bridge rectifier 110 includes a plurality of bridge diodes D1, D2, D3, D4 configured as a four-diode bridge rectifier coupled to an ac input voltage source (designated "V1") to produce a rectified waveform that is operative as an input voltage for the boost power converter 120. The boost power converter 120 includes boost inductor L1 and boost power switch Q1. The boost power switch Q1, illustrated in FIG. 1 as an n-channel MOSFET, is controlled to conduct intermittently with a duty cycle D to produce a current in the boost inductor L1 that is intermittently conducted to a boost diode D5 with a complementary duty cycle 1-D. The boost diode D5 rectifies the inductor current to produce a dc voltage across an output filter capacitor C1. The resistor $R_{LOAD}$ represents a load connected to the output of the ac-to-dc power converter.

A significant source of power loss in the power converter illustrated in FIG. 1 is the forward voltage drop of the bridge diodes D1, D2, D3, D4. To address this power loss problem, the bridge diodes D1, D2, D3, D4 may be replaced with active switches or active semiconductor switches functioning as synchronous rectifiers or synchronous rectifier switches with a substantially smaller forward voltage drop than passive diodes. An issue in the design of synchronous rectifiers formed with active switches is cross conduction between a pair of synchronous rectifiers, thereby presenting a further power loss problem.

Figure 2:
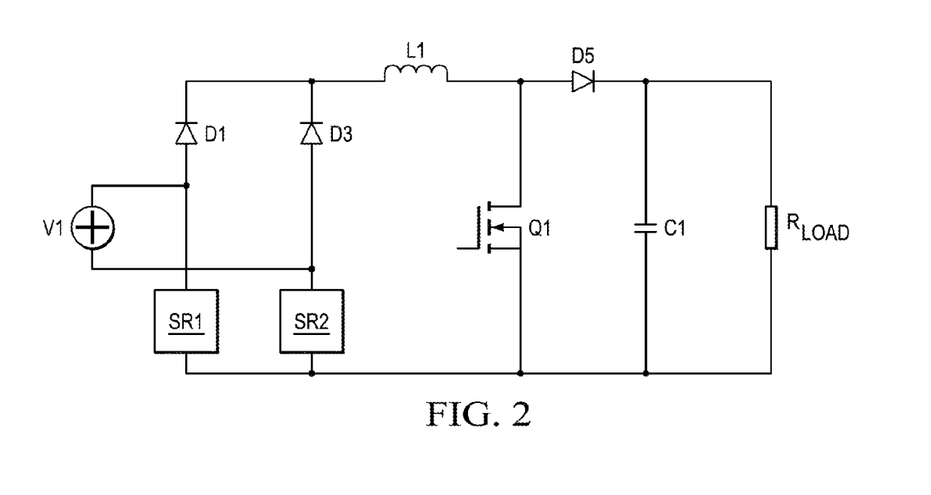
FIG. 2 illustrates a schematic diagram of an embodiment of a power converter including two synchronous rectifier switches in a bridge rectifier constructed according to the principles of the present invention.

Turning now to FIG. 2, illustrated is a schematic diagram of an embodiment of a power converter (e.g., an ac-dc power converter) including first and second synchronous rectifier switches SR1, SR2 in a bridge rectifier constructed according to the principles of the present invention. A conventional synchronous rectifier arrangement cannot be employed to replace the diodes in the bridge rectifier because a conventional synchronous rectifier arrangement (see, e.g., U.S. Pat. No. 6,469,564 to Jansen) uses a diode and a transistor base-emitter p-n junction as two voltage-sensing inputs to determine when the active switch employed as the synchronous rectifier is enabled to conduct. As a result, a conventional synchronous rectifier arrangement is principally used when a single diode is employed, but suffers degradation of power converter efficiency when coupled to another active switch. When a conventional synchronous rectifier arrangement is used to replace two or more diodes in a bridge rectifier (top two diodes, bottom two diodes, or upper and lower branch diodes as illustrated in FIG. 1), cross conduction between the two diodes occurs during a brief period of time when both diodes are enabled to conduct. When one synchronous rectifier switch operative as a diode turns on and another turns off, a mismatch of the diode and base emitter p-n junction of the synchronous rectifier switch and the reverse recovery charge of the diode result in overlapping control terminal signals (e.g., gate drive signals), or at least not separated gate drive signals, for the two active switches (e.g., MOSFETs) employed as the synchronous rectifier switches.

Figure 3:
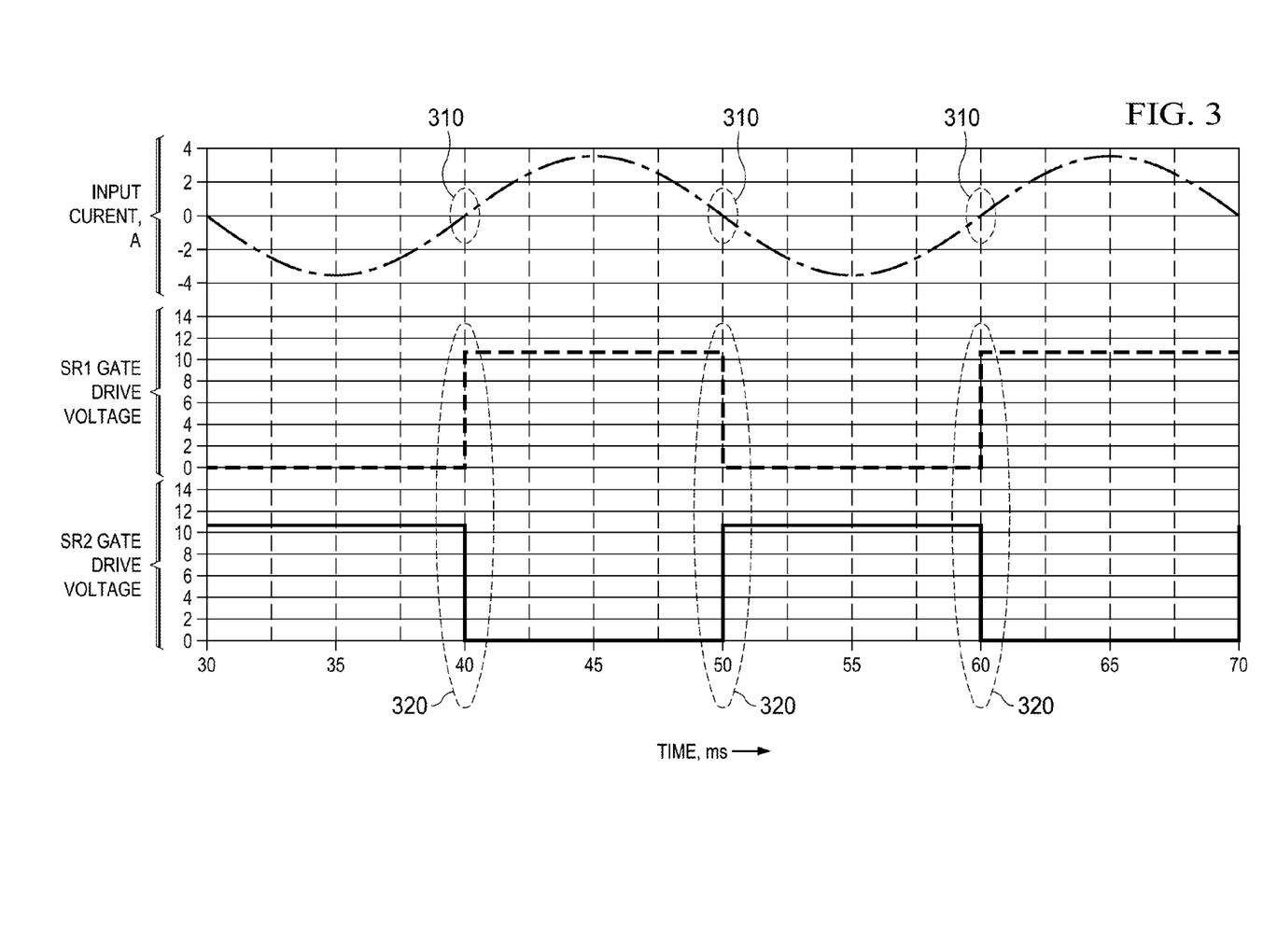
FIG. 3 illustrates a graphical representation of waveforms produced with overlapping gate drive signals for first and second synchronous rectifier switches.

Turning now to FIG. 3, illustrated is a graphical representation of waveforms produced with overlapping gate drive signals for first and second synchronous rectifier switches SR1, SR2. The first and second synchronous rectifier switches SR1, SR2 are coupled in a series arrangement wherein a shoot-through current is produced when both synchronous rectifier switches SR1, SR2 are simultaneously enabled to conduct. In the top portion of FIG. 3, input current spikes 310 are illustrated every 10 milliseconds ("ms") for a 50 hertz ("Hz") input ac voltage due to diode cross conduction. In the middle and lower portions of FIG. 3, gate drive waveforms are illustrated that enable conduction of the first and second synchronous rectifier switches SR1, SR2 without a period of separation between their high gate drive voltage levels (also referred to as gate drive signal overlap 320). As a consequence, the input voltage source is briefly coupled to a short circuit every half line cycle that produces a spike in current from the input voltage source. Such circuit operation generally results in a high level of electromagnetic interference ("EMI"), and increases conduction losses for the bridge rectifier.

Figure 4:
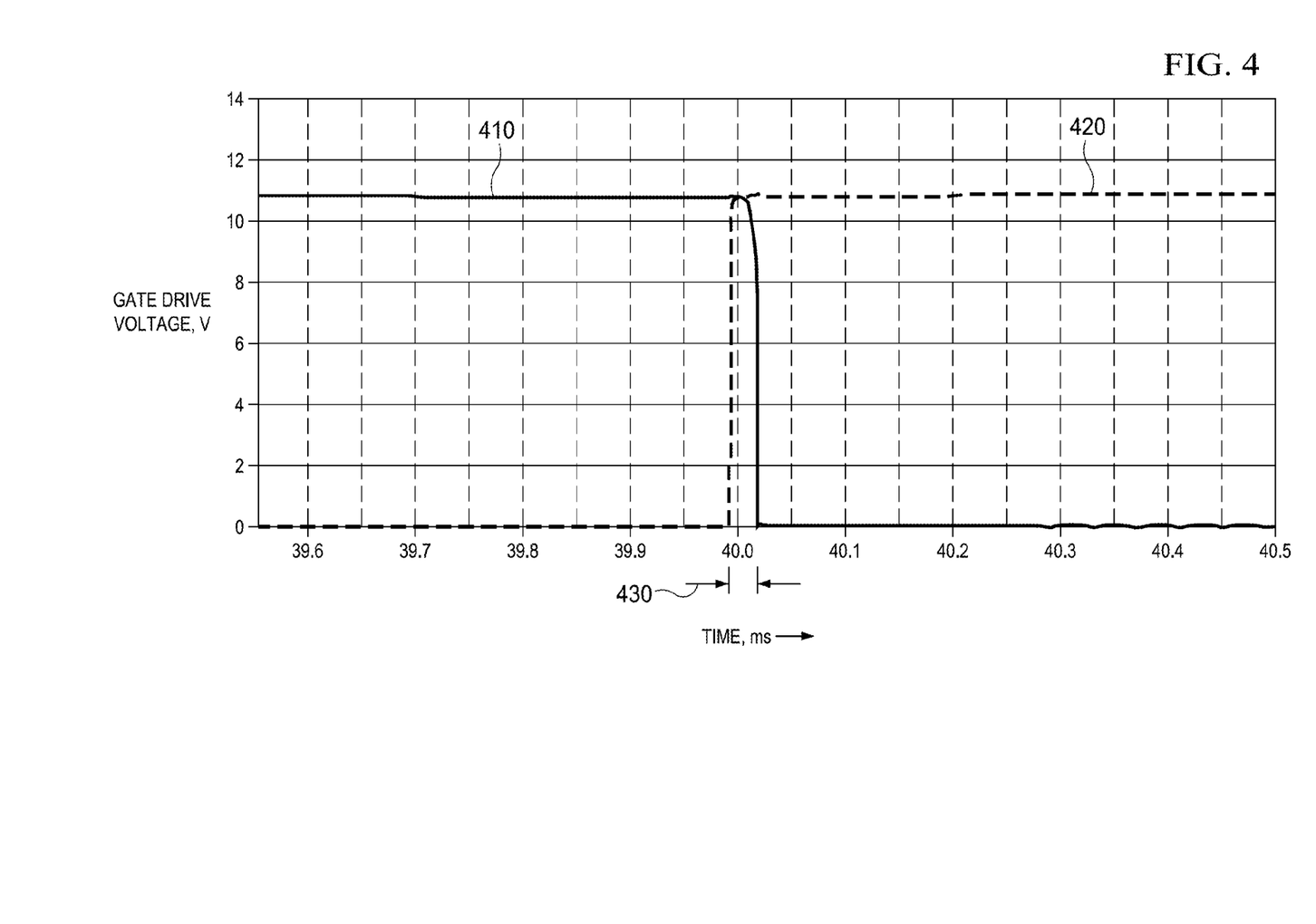
FIG. 4 illustrates a graphical representation of waveforms produced with gate drive signals for first and second synchronous rectifier switches.

Turning now to FIG. 4, illustrated is a graphical representation of waveforms produced with gate drive signals for first and second synchronous rectifier switches SR1, SR2. As illustrated in FIG. 4, a period of overlap is shown for conventional synchronous rectifier designs during which both synchronous rectifier switches SR1, SR2 are enabled to conduct (first synchronous rectifier gate drive signal 410 and second synchronous rectifier gate drive signal 420 provide an overlap 430), producing thereby a spike in input current from the input voltage source. By replacing the diodes D2, D4 of the bridge rectifier of FIG. 1 with the first and second synchronous rectifier switches SR1, SR2 in accordance with the principles of the present invention, cross conduction therebetween may be substantially reduced.

Figure 5:
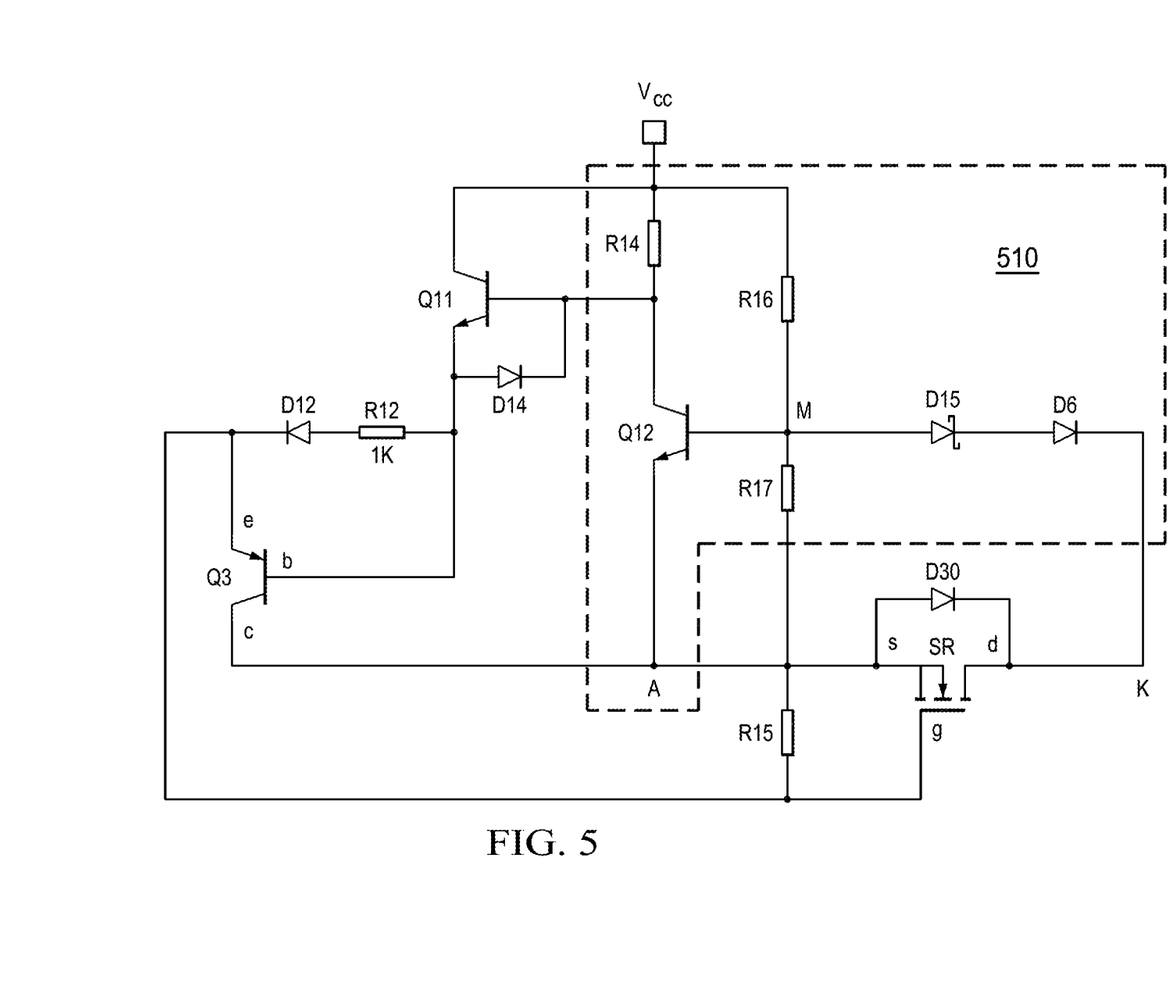
FIG. 5 illustrates a schematic diagram of an embodiment of a controller for a switch constructed according to the principles of the present invention.

Turning now to FIG. 5, illustrated is a schematic diagram of an embodiment of a controller for a switch (e.g., a synchronous rectifier switch SR) constructed according to the principles of the present invention. The controller illustrated in FIG. 5 includes elements that charge or discharge a gate-to-source capacitance of the synchronous rectifier switch SR. Charging and discharging gate-to-source capacitance is generally an obstacle for quickly enabling or disabling conductivity of an active switch such as a MOSFET employed as the synchronous rectifier switch SR. Quickly disabling conductivity of the synchronous rectifier switch SR is important for eliminating (or substantially eliminating) cross conduction thereof with another active switch in a power converter.

A controller for the synchronous rectifier switch SR includes an amplifier 510 with a threshold voltage produced in accordance with a plurality of series-coupled diodes D6, D15. The controller further includes a discharge switch Q3 (e.g., a pnp transistor) with switched terminals coupled between the source and gate terminals of the synchronous rectifier switch SR and a control terminal coupled to an output of the amplifier 510. The discharge switch Q3 is formed with emitter (designated "e"), base (designated "b"), and collector (designated "c") terminals. The synchronous rectifier switch SR is formed with source (designated "s"), gate (designated "g"), and drain (designated "d") terminals. The emitter of the discharge switch Q3 is connected to the gate of the synchronous rectifier switch SR, and the collector of discharge switch Q3 is connected to the source of synchronous rectifier switch SR. As a result, when a body diode D30 of synchronous rectifier switch SR is back biased, voltage of a node K is higher than voltage of a node A, and an amplifier switch (e.g., a npn transistor) Q12 turns on due to current flowing into its base from a bias voltage source $V_{CC}$ through a resistor R16. A charge switch (e.g., transistor) Q11 is turned off and the discharge switch Q3 is turned on. Turning on the discharge switch Q3, which has its emitter and collector terminals connected to the gate and source terminals, respectively, of the synchronous rectifier switch SR, causes the gate charge of the synchronous rectifier switch SR to be quickly discharged, enabling thereby fast turn off of the synchronous rectifier switch SR. Thus, a discharge switch Q3 coupled to terminals of a synchronous rectifier switch SR is configured to enable the quick discharge of a gate-to-source capacitance thereof in response to a back biased condition of the body diode D30 of the synchronous rectifier switch SR.

When the body diode D30 of synchronous rectifier power switch SR is forward biased, and voltage of the node K becomes sufficiently lower than voltage of the node A, the amplifier switch Q12 turns off. The diodes D6, D15 provide a threshold for the voltage of the node K being lower than the voltage of the node A to turn off the amplifier switch Q12, thereby introducing a turn-on delay for the synchronous rectifier switch SR. Turning off the amplifier switch Q12 enables a resistor R14 to provide a bias current from the bias voltage source $V_{CC}$ to the base of the charge switch Q11 that is thereby turned on. Turning on the charge switch Q11 provides a positive bias voltage from the bias voltage source $V_{CC}$ through a diode D12 to the gate of synchronous rectifier switch SR, enabling it to conduct. Note that voltage of the node A should be higher than voltage of the node K plus a threshold voltage $V_{threshold}$ to induce the synchronous rectifier switch SR turn on. A turn-on delay is produced by causing voltage of the node A to be higher than voltage of the node K plus a threshold voltage $V_{threshold}$. Thus, a charge switch Q11 coupled to terminals of a synchronous rectifier switch SR is configured to charge a gate-to-source capacitance thereof after a delay in response to a forward biased condition of the synchronous rectifier switch SR. The remaining circuit elements illustrated in FIG. 5 such as resistors R12, R15, R17 are included to provide proper levels of voltages and currents for reliable operation of the controller, applying considerations for specific devices such as required voltage and current levels for proper controller operation.

For the controller illustrated in FIG. 5, the voltage $V_A$ of node A is equal to the voltage $V_M$ of node M minus the base-emitter p-n junction forward voltage drop of the amplifier switch Q12. The voltage $V_K$ of node K is the voltage $V_M$ of node M minus the sum of the p-n junction forward voltage drops of series-coupled diodes D15, D6. The voltage $V_{threshold}$ is the threshold voltage of the synchronous rectifier switch SR. The voltage $V_{beQ12}$ is the base-emitter voltage of the amplifier switch Q12. The voltage $V_{fD15}$ is the forward-diode voltage of diode D15. The voltage $V_{fD6}$ is the forward-diode voltage of diode D6.

$$V_A = V_M - V_{beQ12} \tag{1}$$

$$V_K = V_M - V_{fD15} - V_{fD6} \tag{2}$$

$$V_A = V_K + V_{threshold} \tag{3}$$

$$V_{threshold} = V_{fD15} + V_{fD6} - V_{beQ12} \tag{4}$$

As opposed to the circuits described by Jansen in U.S. Pat. No. 6,060,943 and U.S. Pat. No. 6,469,564, the controller for the synchronous rectifier switch SR introduced herein has a turn-on delay generated by the series-coupled diodes D6, D15, preferably in the range of one microsecond ("µs") to four milliseconds ("ms"). In the circuits described by Jansen, when voltage of node A is higher than voltage of node K, a current flows from node A to node K. However, in FIG. 5, the voltage of node A should be sufficiently higher than voltage of node K plus the threshold voltage $V_{threshold}$ to make the synchronous rectifier switch SR turn on, thus generating a turn-on delay.

Figure 6:
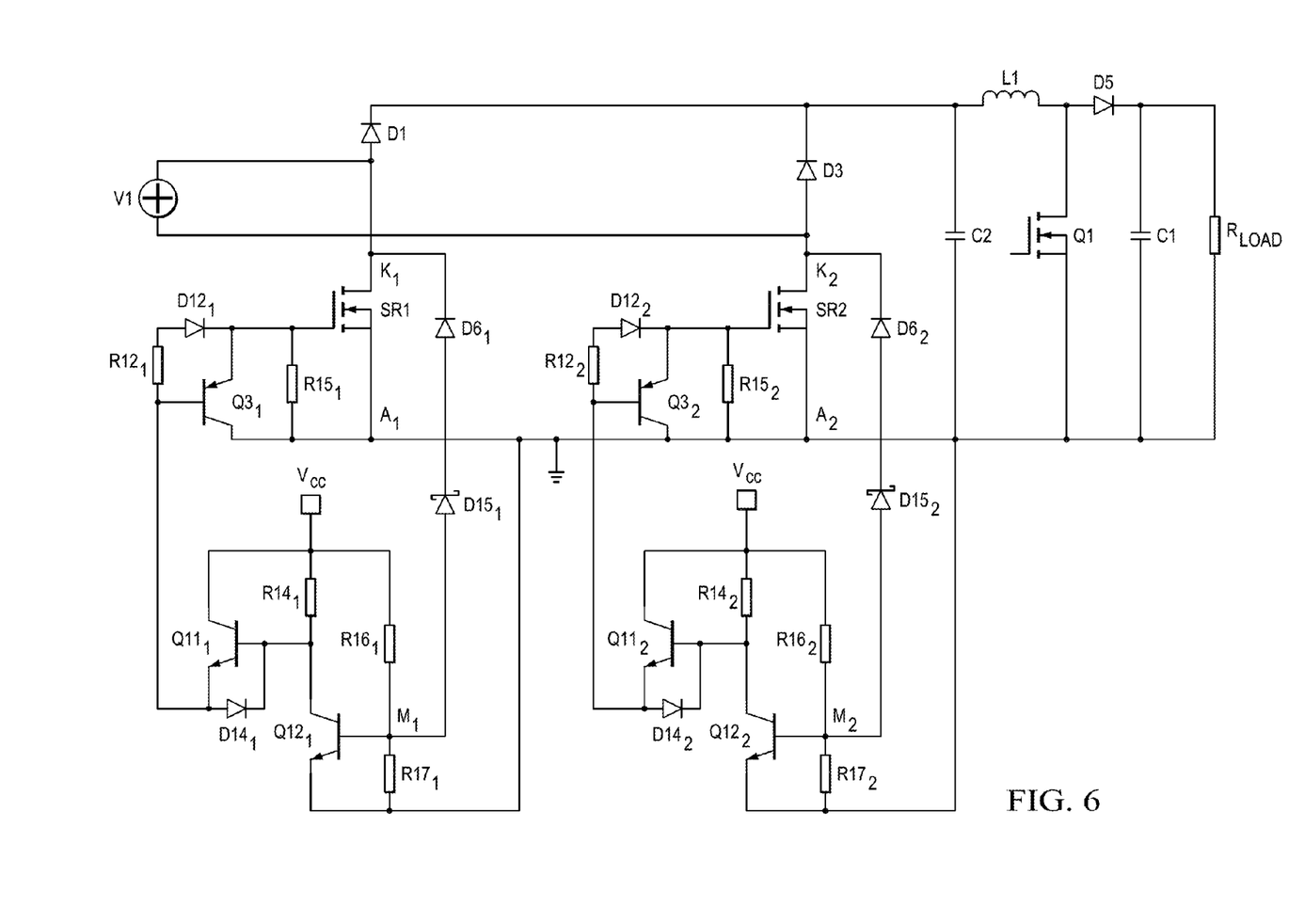
FIG. 6 illustrates a schematic diagram of an embodiment of a power converter including a bridge rectifier formed with first and second synchronous rectifier switches constructed in accordance with the principles of the present invention.

Turning now to FIG. 6, illustrated is a schematic diagram of an embodiment of a power converter including a bridge rectifier formed with first and second synchronous rectifier switches SR1, SR2 constructed in accordance with the principles of the present invention. In the bridge rectifier illustrated in FIG. 6, the bottom two diodes of the bridge rectifier illustrated in FIG. 1 are replaced with the first and second synchronous rectifier switches SR1, SR2 and associated controller coupled to a bias voltage source $V_{CC}$. The first and second synchronous rectifier switches SR1, SR2 and the associated controller coupled to the bias voltage source $V_{CC}$ are each illustrated and described hereinabove with reference to the synchronous rectifier switch SR illustrated in FIG. 5. The turn on of each of the first and second synchronous rectifier switches SR1, SR2 is delayed, but a turn off thereof is accelerated by rapid discharge of the respective gate-to-source capacitances. A dead time between the gates of the first and second synchronous rectifier switches SR1, SR2 is thereby produced, and cross conduction is substantially eliminated. As a result, the input current spikes illustrated in FIG. 3 are substantially attenuated.

Figure 7:
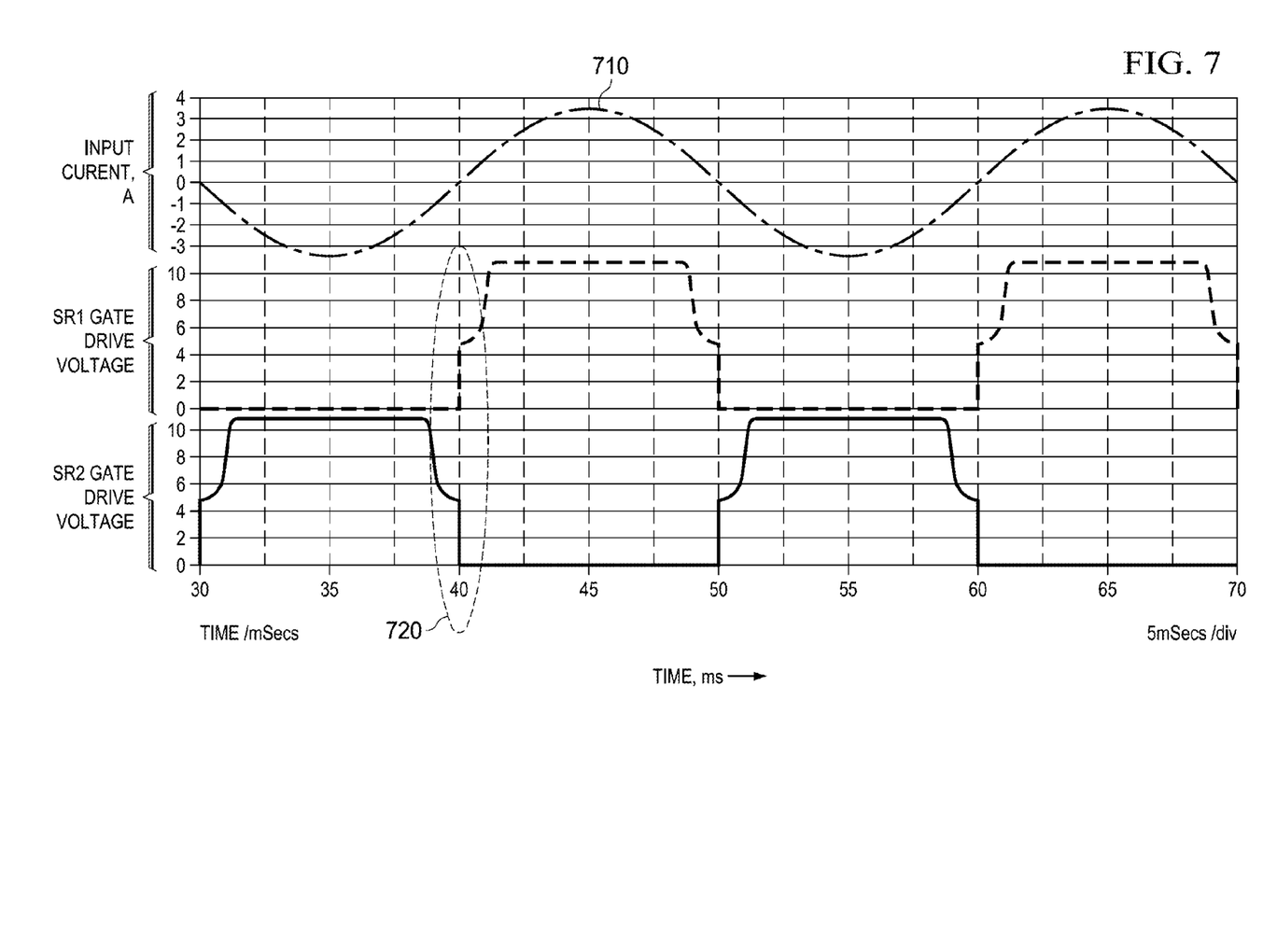
FIG. 7 illustrates a graphical representation of waveforms produced with non-overlapping gate drive signals for first and second synchronous rectifier switches in accordance with the principles of the present invention.

Turning now to FIG. 7, illustrated is a graphical representation of waveforms produced with non-overlapping gate drive signals for first and a second synchronous rectifier switches SR1, SR2 in accordance with the principles of the present invention. The first and second synchronous rectifier switches SR1, SR2 are coupled in a circuit arrangement wherein a shoot-through current would be produced if both synchronous rectifier switches SR1, SR2 were simultaneously enabled to conduct. In the top portion of FIG. 7, input current spikes due to diode cross conduction are no longer visible (see waveform 710). In the middle and lower portions of FIG. 7, gate drive waveforms are illustrated without overlap (see, e.g., region 720) between their high voltage states. As a consequence, the input voltage source is not presented with brief periodic short circuits, thereby eliminating an unnecessarily high level of electromagnetic interference, and decreasing conduction losses for the bridge rectifier.

Figure 8:
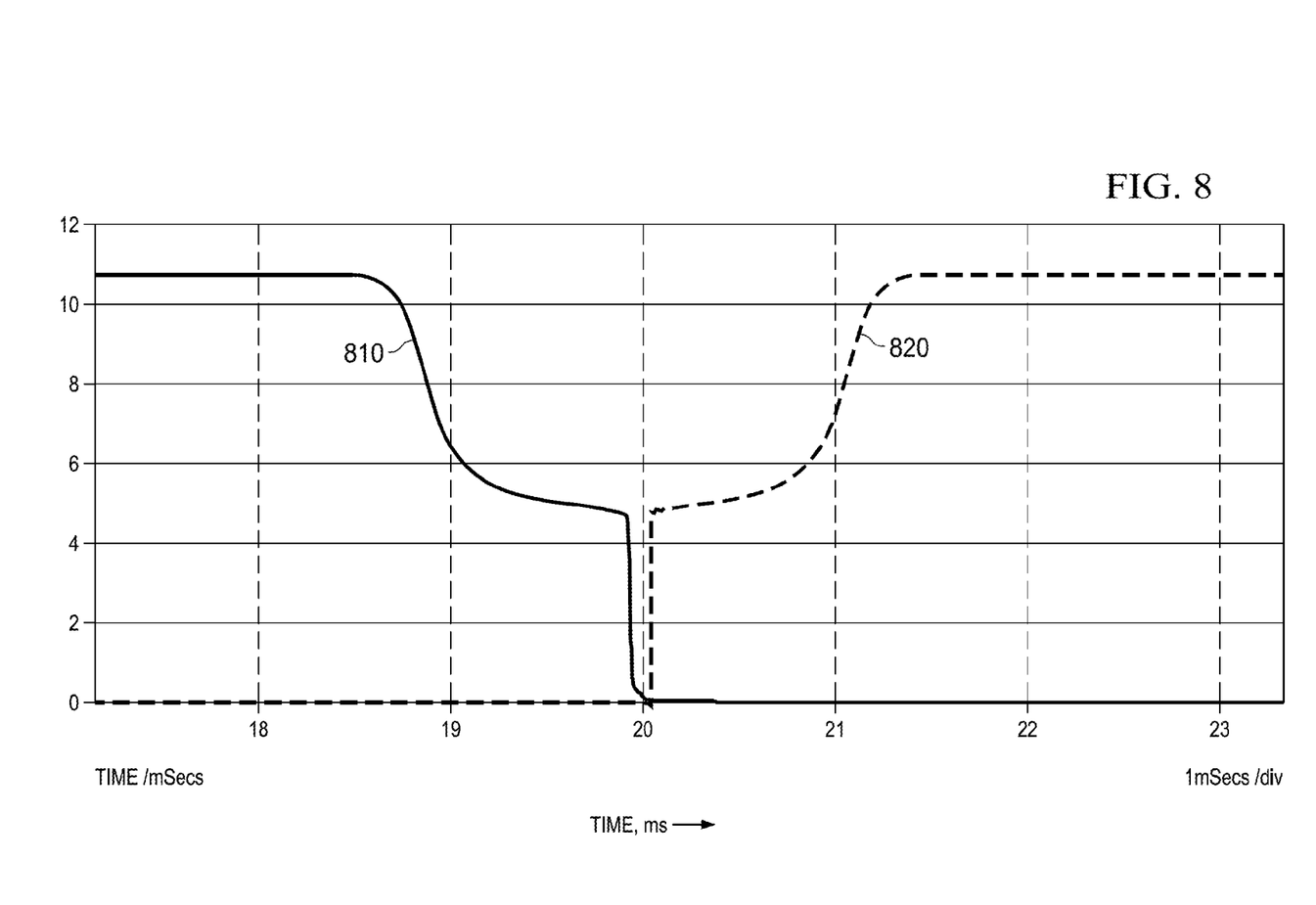
FIG. 8 illustrates a graphical representation demonstrating dead time between the first and second synchronous rectifier switches introduced with respect to FIG. 6.

Turning now to FIG. 8, illustrated is a graphical representation demonstrating dead time between the first and second synchronous rectifier switches SR1, SR2, introduced with respect to FIG. 6. The graphical representation illustrates gate drive waveforms 810, 820 for gate drive signals for the first and second synchronous rectifier switches SR1, SR2, respectively, that demonstrate a fast turn off of the first synchronous rectifier switch SR1 and a turn on with a delay for the second synchronous rectifier switch SR2. Thus, in the controller introduced herein, a second diode (diode D15 in series with the diode D6) is included therein that detects a forward voltage drop across a switch (e.g., the first synchronous rectifier switch SR1). A discharge switch Q3, diode D12, and resistors R12, R15 are included in controller for the switch (e.g., the first synchronous rectifier switch SR1) to quickly discharge a gate charge thereof, enabling thereby fast turn off of the switch.

Figure 9:
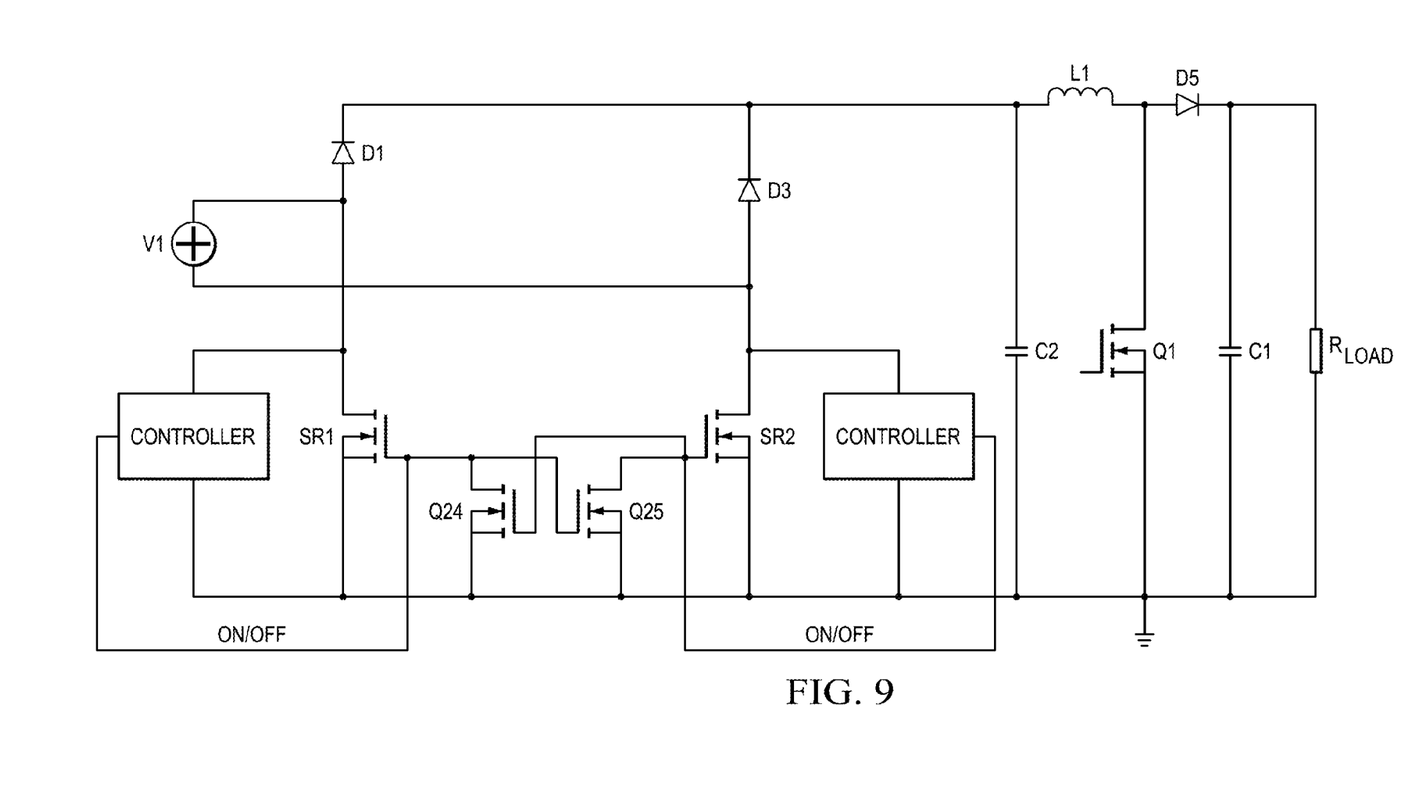
FIG. 9 illustrates a schematic diagram of an embodiment of a controller for first and second synchronous rectifier switches constructed according to the principles of the present invention.

Turning now to FIG. 9, illustrated is a schematic diagram of an embodiment of a controller for first and second synchronous rectifier switches SR1, SR2 constructed according to the principles of the present invention. The controller includes first and second lock switches Q24, Q25 coupled to gate terminals of the first and second synchronous rectifier switches SR1, SR2, respectively, to provide a further mechanism to prevent cross conduction of the first and second synchronous rectifier switches SR1, SR2. The first and second lock switches Q24, Q25 form a mutual lock circuit for the first and second synchronous rectifier switches SR1, SR2, wherein a switched terminal of one of the lock switches (e.g., the first lock switch Q24) is coupled to a control terminal of the other lock switch (e.g., the second lock switch Q25). Accordingly, the gate terminal of the first lock switch Q24 is cross-coupled to the drain terminal of the second lock switch Q25, and the gate terminal of the second lock switch Q25 is cross-coupled to the drain terminal of first lock switch Q24. By cross-coupling the gate and drain terminals of the first and second lock switches Q24, Q25, only one can be switched on at the same time (i.e., only one can sustain a substantial positive voltage at its drain terminal). However, cross coupling the gate and drain terminals of the first and second lock switches Q24, Q25, still allows both switches to be off at the same time. The remainder of the controller illustrated in FIG. 9 is formed with analogous components illustrated and described with reference to FIG. 5.

Thus, a controller for a switch has been introduced herein. In one embodiment, the controller for the switch (e.g., a synchronous rectifier switch) includes an amplifier (e.g., coupled to a bias voltage source) including a plurality of series-coupled diodes configured to produce an input offset voltage therefor and a discharge switch having first and second switched terminals coupled to gate and source terminals, respectively, of the switch and a control terminal coupled to an output of the amplifier. The discharge switch is configured to discharge a gate-to-source capacitance of the switch. In related embodiments, the gate terminal of the switch is coupled to a bias voltage source through a resistor, and/or the gate terminal of the switch is coupled to a bias voltage source through a charge switch with a control terminal coupled to the output of the amplifier. The amplifier may also include an amplifier switch having a base terminal coupled to an input of the amplifier and through the plurality of series-coupled diodes to a drain terminal of the switch, an emitter terminal coupled to the source terminal of the switch, and a collector terminal coupled to the output of the amplifier. The input offset voltage produced by the plurality of series-coupled diodes is configured to cause a turn-on delay (e.g., in a range of one microsecond to four milliseconds) for the switch. When employed with multiples switches, the controller may further include a mutual lock circuit including a first lock switch and a second lock switch coupled to a gate terminal of a switch and a gate terminal of another switch, respectively, wherein a switched terminal (e.g., drain terminal) of the first lock switch is coupled to a control terminal (e.g., gate terminal) of the second lock switch.

In a related embodiment, a controller for a power converter and method of operating the same employable with a bridge rectifier having first and second synchronous rectifier switches has been introduced herein. The controller includes an amplifier including an amplifier switch and a plurality of series-coupled diodes configured to produce a threshold voltage to enable a turn-on delay for the first synchronous rectifier switch. The turn-on delay is a function of a voltage at a source terminal of the first synchronous rectifier switch being higher than a voltage at a drain terminal of the first synchronous rectifier switch by the threshold voltage. Also, the amplifier switch is configured to be turned off when a voltage at the source terminal is higher than a voltage at the drain terminal of the first synchronous rectifier switch by the threshold voltage and a body diode of the first synchronous rectifier switch is forward biased, thereby causing a charge switch to provide a positive bias voltage to the gate terminal of the first synchronous rectifier switch to enable a conductivity thereof.

The controller also includes a discharge switch having first and second switched terminals coupled to gate and source terminals, respectively, of the first synchronous rectifier switch and a control terminal coupled to an output of the amplifier. The discharge switch is configured to discharge a gate-to-source capacitance of the first synchronous rectifier switch to enable a turn off thereof. The discharge switch is configured to be turned on and discharge the gate-to-source capacitance of the first synchronous rectifier switch when a body diode of the first synchronous rectifier switch is back biased. Additionally, the amplifier is configured to enable the turn-on delay for the first synchronous rectifier switch and the discharge switch is configured to enable the turn off of the first synchronous rectifier switch to substantially eliminate cross conduction with the second synchronous rectifier switch. Also, the gate terminal of the first synchronous rectifier switch is coupled to a bias voltage source through a charge switch with a control terminal coupled to the output of the amplifier, and the gate terminal of the first synchronous rectifier switch is coupled to a bias voltage source through a resistor. In accordance with the first and second synchronous rectifier switches, a mutual lock circuit includes a first lock switch and a second lock switch coupled to a gate terminal of the first and second synchronous rectifier switches, respectively, wherein a switched terminal (e.g., drain terminal) of the first lock switch is coupled to a control terminal (e.g., gate terminal) of the second lock switch.

Those skilled in the art should understand that the previously described embodiments of a synchronous rectifier power switch and related methods of operating the same are submitted for illustrative purposes only. In addition, various power converter topologies are well within the broad scope of the present invention. While the synchronous rectifier power switch has been described in the environment of a flyback power converter, it may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A controller employable with a bridge rectifier having first and second synchronous rectifier switches, comprising:
   an amplifier configured to enable a turn-on delay with a plurality of series-coupled diodes for said first synchronous rectifier switch;
   a discharge switch having a control terminal coupled to an output of said amplifier via a charge switch, and first and second switched terminals coupled to gate and source terminals, respectively, of said first synchronous rectifier switch and configured to discharge a gate-to-source capacitance of said first synchronous rectifier switch to enable a turn off thereof; and
   a mutual lock circuit including a first lock switch and a second lock switch coupled to said gate terminal of said first synchronous rectifier switch and a gate terminal of said second synchronous rectifier switch, respectively, wherein a switched terminal of said first lock switch is cross-coupled to a control terminal of said second lock switch, a switched terminal of said second lock switch is cross-coupled to a control terminal of said first lock switch, and said first lock switch is parallel-coupled to said discharge switch.

2. The controller as recited in claim 1 wherein said amplifier is configured to produce a threshold voltage to enable said turn-on delay for said first synchronous rectifier switch.

3. The controller as recited in claim 1 wherein said amplifier is configured to produce a threshold voltage in accordance with said plurality of series-coupled diodes to enable said turn-on delay for said first synchronous rectifier switch.

4. The controller as recited in claim 1 wherein said turn-on delay is a function of a voltage at said source terminal being higher than a voltage at a drain terminal of said first synchronous rectifier switch by a threshold voltage.

5. The controller as recited in claim 1 wherein an amplifier switch is configured to be turned off when a voltage at said source terminal is higher than a voltage at a drain terminal of said first synchronous rectifier switch by a threshold voltage and a body diode of said first synchronous rectifier switch is forward biased, thereby causing said charge switch to provide a positive bias voltage to said gate terminal of said first synchronous rectifier switch to enable a conductivity thereof.

6. The controller as recited in claim 1, further comprising:
   another amplifier configured to enable a turn-on delay with another plurality of series-coupled diodes for said second synchronous rectifier switch; and
   another discharge switch having a control terminal coupled to an output of said another amplifier via another charge switch, and first and second switched terminals coupled to gate and source terminals, respectively, of said second synchronous rectifier switch and configured to discharge a gate-to-source capacitance of said second synchronous rectifier switch to enable a turn off thereof.

7. The controller as recited in claim 1 wherein said discharge switch is configured to be turned on and discharge said gate-to-source capacitance of said first synchronous rectifier switch when a body diode of said first synchronous rectifier switch is back biased.

8. The controller as recited in claim 1 wherein said amplifier is configured to enable said turn-on delay for said first synchronous rectifier switch and said discharge switch is configured to enable said turn off of said first synchronous rectifier switch to substantially eliminate cross conduction with said second synchronous rectifier switch.

9. The controller as recited in claim 1 wherein said charge switch is configured to provide a positive bias voltage from a bias voltage source through a diode to said gate terminal of said first synchronous rectifier switch to enable a conductivity thereof.

10. The controller as recited in claim 1 wherein said discharge switch is a bipolar transistor.

11. A method of operating a controller employable with a bridge rectifier having first and second synchronous rectifier switches, comprising:
    enabling a turn-on delay for said first synchronous rectifier switch with a plurality of series-coupled diodes of an amplifier;
    discharging a gate-to-source capacitance of said first synchronous rectifier switch with a discharge switch having a control terminal coupled to an output of said amplifier via a charge switch, and first and second switched terminals coupled to gate and source terminals, respectively, of said first synchronous rectifier switch to enable a turn off of said first synchronous rectifier switch; and
    reducing cross conduction between said first and second synchronous rectifier switches with a mutual lock circuit including a first lock switch and a second lock switch coupled to said gate terminal of said first synchronous rectifier switch and a gate terminal of said second synchronous rectifier switch, respectively, wherein a switched terminal of said first lock switch is cross-coupled to a control terminal of said second lock switch, a switched terminal of said second lock switch is cross-coupled to a control terminal of said first lock switch, and said first lock switch is parallel-coupled to said discharge switch.

12. The method as recited in claim 11 wherein said enabling comprises producing a threshold voltage in accordance with said plurality of series-coupled diodes.

13. The method as recited in claim 11 wherein said enabling comprises turning off an amplifier switch when a voltage at said source terminal is higher than a voltage at a drain terminal of said first synchronous rectifier switch by a threshold voltage and a body diode of said first synchronous rectifier switch is forward biased, thereby causing said charge switch to provide a positive bias voltage to said gate terminal of said first synchronous rectifier switch to enable a conductivity thereof.

14. The method as recited in claim 11 wherein discharging comprises turning on said discharge switch and discharging said gate-to-source capacitance of said first synchronous rectifier switch when a body diode of said first synchronous rectifier switch is back biased.

15. A power converter, comprising:
    a bridge rectifier having first and second synchronous rectifier switches; and
    a controller, including:
        an amplifier configured to enable a turn-on delay with a plurality of series-coupled diodes for said first synchronous rectifier switch,
        a discharge switch having a control terminal coupled to an output of said amplifier via a charge switch, and first and second switched terminals coupled to gate and source terminals, respectively, of said first synchronous rectifier switch and configured to discharge a gate-to-source capacitance of said first synchronous rectifier switch to enable a turn off thereof, and
        a mutual lock circuit including a first lock switch and a second lock switch coupled to said gate terminal of said first synchronous rectifier switch and a gate terminal of said second synchronous rectifier switch, respectively, wherein a switched terminal of said first lock switch is cross-coupled to a control terminal of said second lock switch, a switched terminal of said second lock switch is cross-coupled to a control terminal of said first lock switch, and said first lock switch is parallel-coupled to said discharge switch.

16. The power converter as recited in claim 15 wherein said amplifier is configured to produce a threshold voltage in accordance with said plurality of series-coupled diodes to enable said turn-on delay for said first synchronous rectifier switch.

17. The power converter as recited in claim 15 wherein an amplifier switch is configured to be turned off when a voltage at said source terminal is higher than a voltage at a drain terminal of said first synchronous rectifier switch by a threshold voltage and a body diode of said first synchronous rectifier switch is forward biased, thereby causing said charge switch to provide a positive bias voltage to said gate terminal of said first synchronous rectifier switch to enable a conductivity thereof.

18. The power converter as recited in claim 15 wherein said discharge switch is configured to be turned on and discharge said gate-to-source capacitance of said first synchronous rectifier switch when a body diode of said first synchronous rectifier switch is back biased.

19. The power converter as recited in claim 15 wherein said amplifier is configured to enable said turn-on delay for said first synchronous rectifier switch and said discharge switch is configured to enable said turn off of said first synchronous rectifier switch to substantially eliminate cross conduction with said second synchronous rectifier switch.

20. The power converter as recited in claim 15 wherein said charge switch is configured to provide a positive bias voltage from a bias voltage source through a diode to said gate terminal of said first synchronous rectifier switch to enable a conductivity thereof.

* * * * *